(12) United States Patent
Fowlkes et al.

(10) Patent No.: US 11,657,102 B2
(45) Date of Patent: May 23, 2023

(54) AUTOMATING SOLUTION PROMPTS BASED UPON SEMANTIC REPRESENTATION

(71) Applicant: IP.COM I, LLC, Fairport, NY (US)

(72) Inventors: William Y. Fowlkes, Pittsford, NY (US); Wen Ruan, Manlius, NY (US); Young No, West Henrietta, NY (US)

(73) Assignee: IP.COM I, LLC, Fairport, NY (US)

( * ) Notice: Subject to any disclaimer, the term of this patent is extended or adjusted under 35 U.S.C. 154(b) by 336 days.

(21) Appl. No.: 16/845,205

(22) Filed: Apr. 10, 2020

(65) Prior Publication Data
US 2020/0342036 A1    Oct. 29, 2020

Related U.S. Application Data

(60) Provisional application No. 62/840,041, filed on Apr. 29, 2019.

(51) Int. Cl.
G06F 16/93     (2019.01)
G06F 16/903    (2019.01)

(52) U.S. Cl.
CPC ........ G06F 16/93 (2019.01); G06F 16/90335 (2019.01)

(58) Field of Classification Search
None
See application file for complete search history.

(56) References Cited

U.S. PATENT DOCUMENTS

| | | | |
|---|---|---|---|
| 5,581,663 A | 12/1996 | Zlotin et al. | |
| 7,958,078 B2* | 6/2011 | Lin | G06F 16/358 706/20 |
| 8,548,951 B2 | 10/2013 | Solmer et al. | |
| 9,971,771 B2 | 5/2018 | Ryger et al. | |
| 11,080,336 B2* | 8/2021 | Van Dusen | G06F 16/90335 |
| 11,379,538 B1* | 7/2022 | McClusky | G06F 16/353 |
| 2001/0034629 A1 | 10/2001 | Cronin | |
| 2005/0131874 A1 | 6/2005 | Verbitsky | |
| 2008/0177702 A1* | 7/2008 | Morgan | G16H 50/70 |

(Continued)

OTHER PUBLICATIONS

Recio-García, Juan, et al. "jcolibri2: A framework for building Case-based reasoning systems", Elsevier, Science of Computer Programming, vol. 79, (2014), pp. 126-145. (Year: 2014).*

(Continued)

*Primary Examiner* — Scott A. Waldron
(74) *Attorney, Agent, or Firm* — Simpson & Simpson, PLLC

(57) ABSTRACT

Methods, systems, and computer program products for analyzing one or more perceived or technical problems or proposed solutions, and proposing a result are disclosed. In accordance therewith, a query is received as an input, one or more documents that are most closely semantically related to the query are retrieved, a set of concept terms derived from each of the query and the retrieved semantically related documents is obtained, a list of generic Solution Prompts, each of which generic Solution Prompt thereof includes a placeholder for insertion of a word or phrase from the set of concept terms, is provided, and a morphological analysis is applied to combine the list of generic Solution Prompts with the obtained set of concept terms to create a list of Specific Solution Prompts.

32 Claims, 11 Drawing Sheets

(56) References Cited

U.S. PATENT DOCUMENTS

2011/0040720 A1* 2/2011 Zangwill .................. G06N 5/04
706/52
2015/0134543 A1 5/2015 Ivanic et al.
2016/0004973 A1 1/2016 Trenkov et al.
2016/0140217 A1* 5/2016 Sano ...................... G06N 20/10
706/55

OTHER PUBLICATIONS

Chollar, Ph.D., P.E., George W. An Introduction to SDI Tools v3-Triptych Demonstration; https://youtu.be/adWasWRIWdk. last accessed Jun. 2, 2020, www.stat-design.com.
The Theory of Inventive Problem Solving (TRIZ) described by G. S. Altshuller is known for solving technical problems in order to propose inventive solutions therefor. (See, e g., Creativity As an Exact Science (ISBN-13: 978-0677212302) 1984.
40 Inventive Principles and a Conflicts Matrix to guide the use of the principles to solve technical problems 30 (See, e.g., 40 Principles: TRIZ Keys to Innovation by Genrich Altshuller (Author), Dana W. Clarke (Author), Uri Fedoseev (Illustrator), Steve Rodman (Translator), Lev Shulyak (Collaborator), Leonid Lemer (Collaborator) (ISBN-13: 978-096407405) 2005.
"A review of TRIZ, and its benefits and challenges in practice", by Imoh M. Ilevbare, David Probert, Robert Phaal Technovation 33 (2013) 30-37.

* cited by examiner

Improve an Existing Solution

Current Solution:

Design a robot arm actuator with a high torque axial flux permanent magnet coupled with planetary gear system to deliver a slim topology for easy loading.

Solution Concept Topics:

| rotor | motor | gear | magnetic | flux | winding | pole | actuator | shaft |

Idea Generator: 450b

Charge the actuator with a force that is opposite to the direction of the working force.

New Solution:

Cancel

- Problem Solving ▶
- Problem Analysis
- Solution Analysis
- Improve Existing Solution
- Find New Solutions

Fig. 7C

AUTOMATING SOLUTION PROMPTS BASED UPON SEMANTIC REPRESENTATION

CROSS REFERENCE TO RELATED APPLICATIONS

This application claims priority under 35 USC 119 to U.S. Provisional Patent Application No. 62/840,041, filed Apr. 29, 2019, which application is incorporated herein by reference in its entirety.

TECHNICAL FIELD

The present disclosure is directed to systems and methods, associated apparatuses, and a data storage device for performing analyses and presenting results thereof, and more specifically, to computer assisted automated problem solving and innovation.

BACKGROUND

The Theory of Inventive Problem Solving (TRIZ) described by G. S. Altshuller is known for solving technical problems in order to propose inventive solutions therefor. (See, e.g., *Creativity As an Exact Science* (ISBN-13: 978-0677212302), which is incorporated herein by reference in its entirety). The 1985 version of classical TRIZ included ARIZ-85c, a conflict solving algorithm, seventy-six (76) Standard Solutions, and Altshuller's version of Laws of Evolution. For purposes of the instant disclosure, we adopt Altshuller's definitions of technical problems, namely problems in engineered systems that involve a dilemma or a trade-off between two contradictory elements that require an inventive solution. The TRIZ approach to problem solving is illustrated in FIG. 1 and is generally identified by reference numeral 50. The TRIZ approach 50 begins with a technical problem 10, for which an individual must find an inventive solution. According to the approach, the Technical Problem 10 is transformed into an abstract Standard Problem 20, which is known to have one or more generally abstract or generic Standard Solutions 30, as described in the TRIZ corpora. From the generic or abstract Standard Solution 30, an Inventive Solution 40 may be obtained, which attempts to resolve the originally presented Technical Problem 10. The Standard Problem 20 and the abstract Standard Solutions 30 are based on Altshuller's study of previously patented inventions.

Soon after Altshuller's first book, the TRIZ heuristics were reduced to 40 Inventive Principles and a Conflicts Matrix to guide the use of the principles to solve technical problems (See, e.g., 40 *Principles: TRIZ Keys to Innovation* by Genrich Altshuller (Author), Dana W. Clarke (Author), Uri Fedoseev (Illustrator), Steve Rodman (Translator), Lev Shulyak (Collaborator), Leonid Lerner (Collaborator) (ISBN-13: 978-096407405), which is incorporated herein by reference in its entirety. As described in "A review of TRIZ, and its benefits and challenges in practice", by Imoh M. Ilevbare, David Probert, Robert Phaal Technovation 33 (2013) 30-37, which is incorporated herein by reference in its entirety, the conflict matrix and innovative principles are easy to understand and were widely adopted, but ultimately were found to be inadequate owing to the facts that: 1.) the TRIZ methodology is made difficult by the need to find a best abstract problem to represent a real technical problem, and 2.) by the need to transform an abstract solution into a concrete solution pertaining to the specific technical problem. To this day, these steps have been resistant to standardization or automation. Instead, the skillful application of trained and experienced experts is typically required, which is beyond the ordinary skill of engineers attempting to solve difficult and complex problems.

To this day, a number of TRIZ software tools have been created and examples include: TechOptimizer™ and Goldfire™, commercially available from the Invention Machine Corporation; Guided Innovation Toolkit™, commercially available from Ideation International; and TriSolver™ and TRIZ GB™, commercially available from Guided Brainstorming LLC. However, the above software tools fail to alter the basic algorithms or resolve the difficulties in applying TRIZ. Rather, they merely automate the existing TRIZ processes and provide examples or illustrations to better understand the underlying TRIZ principles. In other words, existing systems, machines, and methods still require that a user transform their Technical Problem into a conflict defining Standard Problem, and then transform the Standard Solution into an Inventive Solution.

Referring now to FIG. 2, which illustrates a process 100 for analyzing a text-based query 150 and finding relevant documents from a document database using a neural network based Artificial Intelligence as described in U.S. Pat. No. 8,548,951, which is incorporated herein by reference in its entirety. As shown in FIG. 2, a computer based document processor 120 generates machine-generated representations for documents and a representation of a query, and then based on the representation of the query, identifies documents stored in the information archive that are related to the query. As shown in FIG. 2, data 110 can be any type of documents, that include, but are not limited to: patents, publications, published patent applications, etc. Features of a document can include, but are not limited to: textual features and semantic features. Document features (textual or semantic) can include, but are not limited to: key words, concepts, document styles and other features that may characterize a document. The document representations can include, but are not limited to: a feature-based vector and a semantic based vector, and possibly other representations of the content of a document. The information archive 135 is based on a set of documents $d_i$ processed to produce a set of document representations $d_iD$. The information archive 135 may be searched based on indices given a query, using a neural network Artificial Intelligence.

What is needed then is an Artificial Intelligence based machine that can analyze a problem and apply TRIZ heuristics so as to automatically present specific and/or concrete solutions that are technologically appropriate to the problem, and which utilizes resources that are either already part of an existing engineering system, or which can be easily introduced using known engineering methods, without requiring extensive training in TRIZ methods.

SUMMARY

The subject matter of the instant disclosure generally relates to machine implemented methods, systems and associated apparatuses that analyze a perceived or technical problem or proposed solution and propose a result.

In one aspect, a method for analyzing a perceived or technical problem or proposed solution and proposing a result in accordance with the instant disclosure can be implemented on a machine including one or more processors in communication with one or more non-transitory computer readable storage media that store specialized computer readable instructions thereon. The machine is capable of communicating on an electronic communications network, and when the one or more processors read the specialized instructions, the method includes: receiving, for example, via the electronic communications network, a first query describing the problem as an input (155); retrieving (180) from a document archive (135) of the one or more non-transitory computer readable storage media, one or more documents that are most closely semantically related to the first query (155); obtaining (220), via a result set summarizer (190), a set of concept terms that are derived from each of the first query (155) and the retrieved one or more semantically related documents (180); providing a first list of generic Solution Prompts (260), each of which generic Solution Prompt thereof includes a placeholder for insertion of a relevant word or phrase from the set of concept terms (220); and, applying a morphological analysis process to combine (270) the first list of generic Solution Prompts (260) with the obtained set of concept terms (220) so as to create a second list of Specific Solution Prompts (280).

In some aspects, the method includes analyzing each respective Specific Solution Prompt of the second list of Specific Solution Prompts for relevance to the first query, generating a numerical score for each respective Specific Solution Prompt of the second list of Specific Solution Prompts based on the relevance, and applying the generated numerical score (350) so as to prioritize each respective Specific Solution Prompt of the second list of Specific Solution Prompts. (300). In further aspects, the generated numerical score (350) for each respective Specific Solution Prompt of the second list of Specific Solution Prompts is based on one or more of: a first score (340) comprising a number of relevant documents returned from the document archive as a result of a second query performed using each of the respective specific Solutions Prompts from the second list of Specific Solution Prompts, and a second score (330) comprising a number of documents common to a first portfolio and a second portfolio. In some aspects, the first portfolio (290) comprises a predefined number of most relevant documents returned from the document archive by the first query, and the second portfolio (310) comprises a predefined number of most relevant documents returned from the document archive as a result of the second query. In some aspects, the predefined number of most relevant documents in each of the first and second portfolio is user definable.

In still yet some aspects, the generated numerical score for each respective Specific Solution Prompt in the second list of Solution Prompts is obtained by algorithmically combining the first score and the second score. In some aspects, the first list of generic Solution Prompts includes one or more Solution Prompts based on TRIZ. In some aspects, the first list of generic solution prompts includes one or more of: 40 Inventive Principles based on TRIZ, a list of separation techniques, 76 Standard Solutions, and Altshuller's Laws of Evolution.

In some aspects of the method, each of the respective Specific Solution Prompts in the second list of Solution Prompts is prioritized from largest to smallest according to the generated numerical score.

In some aspects, the method includes associating a probability with each respective Specific Solution Prompt in the second list of Solution Prompts. In some aspects the probability includes a ratio of the generated numerical score for each respective Specific Solution Prompt in the second list of Solution Prompts and a sum of the generated numerical score for all of the Specific Solution Prompts in the second list of Solution Prompts.

In some aspects, the method includes tracking the previously presented Solution Prompts and user interactions with each of the Solution Prompts and prioritizing Solution Prompts based on the user behavior.

In some aspects, the method includes analyzing a query describing a perceived or technical problem or even a proposed solution; retrieving from a document archive, one or more documents (e.g., patents or non-patent technical literature) that is most closely semantically related to the query; analyzing, by a keyword extractor, the query and the one or more the retrieved documents to obtain a set of concept terms that are related to the query, which are derived from each of the query and the related documents; obtaining a list of generally applicable or generic Solution Prompts, e.g., one or more abstract inventive proposals specific to a perceived or technical problem or proposed solution, that each include one or more suggestions as to where a word or phrase may be inserted into the abstract inventive proposal, wherein upon insertion of a word or phrase pertinent to the perceived or technical problem or proposed solution into the generally applicable or generic Solution Prompt, renders the generally applicable or generic Solution Prompt more pertinent to the perceived or technical problem or proposed solution; creating a list of specific Solution Prompts by combining the list of generally applicable or generic Solution Prompts with the list of concept terms, and using morphological analysis processes to construct and propose possible relevant solutions or results.

In some further aspects, the specific Solution Prompts are analyzed for relevance to the original query describing the perceived or technical problem or proposed solution in order to generate a set of numerical scores specific to each suggestion, which can be used to prioritize the list of Specific Solution Prompts. The numerical score for each suggestion used to prioritize the list of specific Solution Prompts is based on the product of the number of relevant documents returned from the list of all documents when the suggestion is used as a new query and the number of identical documents that are retrieved from the original query and the new query based on the suggestion; looking at a most relevant subset of each the original and new query.

In some aspects, the method includes analyzing each respective Specific Solution Prompt of the second list of Specific Solution Prompts for relevance to the first query, generating a numerical score for each respective Specific Solution Prompt of the second list of Specific Solution Prompts based on the relevance, and applying the generated numerical score (350) so as to prioritize each respective Specific Solution Prompt of the second list of Specific Solution Prompts. (300). In further aspects, the generated numerical score (350) for each respective Specific Solution Prompt of the second list of Specific Solution Prompts is based on one or more of: a first score (340) comprising a number of relevant documents returned from the document archive as a result of a second query performed using each of the respective specific Solutions Prompts from the second list of Specific Solution Prompts, and a second score (330) comprising a number of documents common to a first portfolio and a second portfolio. In some aspects, the first portfolio (290) comprises a predefined number of most relevant documents returned from the document archive by the first query, and the second portfolio (310) comprises a predefined number of most relevant documents returned from the document archive as a result of the second query. In some aspects, the predefined number of most relevant documents in each of the first and second portfolio is user definable.

The features, phrases and key words represent knowledge derived initially from the query, but also represent a body of documents that are related to the query and, by extension, to the perceived or technical problem or proposed solution. These phrases and keywords can be combined with the principles from TRIZ to provide context specific, and technology specific solution prompts, or Specific Solution Prompts, for solving the perceived or technical problem or proposed solution.

In some aspects, a system for automatically analyzing a perceived or technical problem or proposed solution generally includes a machine capable of communicating on an electronic communications platform, the machine having at least one processor and a non-transitory computer readable storage medium storing specialized instructions thereon, which when read by the machine, cause the machine to perform the operations of: receiving a first query describing the perceived or technical problem or proposed solution as an input (155); retrieving (180) from a document archive (135), one or more documents that are most closely semantically related to the first query (155); obtaining (220) via a result set summarizer (190), a set of concept terms that are derived from each of the first query (155) and the retrieved one or more semantically related documents (180); providing a first list of generic Solution Prompts (260), each of which generic Solution Prompt thereof includes a placeholder for insertion of a relevant word or phrase from the set of concept terms (220); and, applying a morphological analysis process to combine (270) the first list of generic Solution Prompts (260) with the obtained set of concept terms (220) so as to create a second list of Specific Solution Prompts (280).

In some aspects, the system analyzes each respective Specific Solution Prompt of the second list of Specific Solution Prompts for relevance to the first query, generates a numerical score for each respective Specific Solution Prompt of the second list of Specific Solution Prompts based on the relevance, and applies the generated numerical score (350) so as to prioritize each respective Specific Solution Prompt of the second list of Specific Solution Prompts. (300). In further aspects of the system, the generated numerical score (350) for each respective Specific Solution Prompt of the second list of Specific Solution Prompts is based on one or more of: a first score (340) comprising a number of relevant documents returned from the document archive as a result of a second query performed using each of the respective specific Solutions Prompts from the second list of Specific Solution Prompts, and a second score (330) comprising a number of documents common to a first portfolio and a second portfolio. In some aspects, the first portfolio (290) comprises a predefined number of most relevant documents returned from the document archive by the first query, and the second portfolio (310) comprises a predefined number of most relevant documents returned from the document archive as a result of the second query. In some aspects, the predefined number of most relevant documents in each of the first and second portfolio is user definable.

In, still yet, some aspects of the system, the generated numerical score for each respective Specific Solution Prompt in the second list of Solution Prompts is obtained by algorithmically combining the first score and the second score. In some aspects, the first list of generic Solution Prompts includes one or more Solution Prompts based on TRIZ. In some aspects, the first list of generic solution prompts includes one or more of: 40 Inventive Principles based on TRIZ, a list of separation techniques, 76 Standard Solutions, and Altshuller's Laws of Evolution.

In some aspects of the system, each of the respective Specific Solution Prompts in the second list of Solution Prompts is prioritized from largest to smallest according to the generated numerical score.

In some aspects, the system includes associating a probability with each respective Specific Solution Prompt in the second list of Solution Prompts. In some aspects the probability includes a ratio of the generated numerical score for each respective Specific Solution Prompt in the second list of Solution Prompts and a sum of the generated numerical score for all of the Specific Solution Prompts in the second list of Solution Prompts.

In some aspects, the system includes mechanisms to track the Solution Prompt presented to the user and track user interactions with each of Solution Prompts, which includes but not limited to review, review time, click and choose as a Solution candidate. The system allows the user to go back and forth on presented Solution Prompts and learns the presentation rate and the probability of success for each type of Inventive Principles, separation techniques, or Standard solutions, and adjusts the prioritization strategy as the user proceeds. For example, certain types presented Solution Prompts based on scores will be getting lower presenting probability if the user keeps ignoring them even though their scores could be high. Certain types of Solutions are not presented after some time will be given a chance to present to the user. This tracking and learning mechanism can work across the boundaries of queries and users, which ends up building a concept/principle relationship network. The network not only links concepts to generic Solution Prompts, principles, techniques or standard solutions with probabilities, but also includes the interactions among the principles/techniques/solutions coupled with specific concepts. For example, one type of concept/principle couple often leads to another concept/principle couple. This knowledge learned from user interactions can be applied to other users with similar context.

In some aspects, the instant disclosure is directed to one or more non-transitory computer readable storage media storing machine readable instructions thereon, e.g., computer readable instructions, which instructions when read by the machine transform the machine into a specialized machine capable of performing the operations of receiving a first query describing the perceived or technical problem or proposed solution as an input (155); retrieving (180) from a document archive (135), one or more documents that are most closely semantically related to the first query (155); obtaining (220) via a result set summarizer (190), a set of concept terms that are derived from each of the first query (155) and the retrieved one or more semantically related documents (180); providing a first list of generic Solution Prompts (260), each of which generic Solution Prompt thereof includes a placeholder for insertion of a relevant word or phrase from the set of concept terms (220); and, applying a morphological analysis process to combine (270) the first list of generic Solution Prompts (260) with the obtained set of concept terms (220) so as to create a second list of Specific Solution Prompts (280).

Other aspects, features and advantages of one or more embodiments will be readily appreciable from the following detailed description and from the accompanying drawings and claims.

BRIEF DESCRIPTION OF THE DRAWINGS

The methods, systems, associated apparatuses, data storage device and/or and programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, apparatuses, storage media, and other implementations directed to automatically analyzing a perceived or technical problem or proposed solution and generating results, e.g., generating solutions to difficult technical problems by automatically generating solution prompts, which are specific to the problem technology, for purposes of assisting individuals such as engineers, discover innovative solutions. Particularly, a list of Solution Prompts is created and presented in response to a description of a technical problem, a description of a proposed technical solution that includes a description of a technology and an engineering system, or any other query that sufficiently describes a technology or engineering system looking for a creative solution or improvement or other useful change. Optionally, the Solution Prompts are presented one at a time as innovation prompts meant to assist a user in overcoming psychological inertia (a catch-all term for the many mental barriers to finding truly creative solutions) and to arrive with their own solutions to the technical problems they may face.

Figure 1:
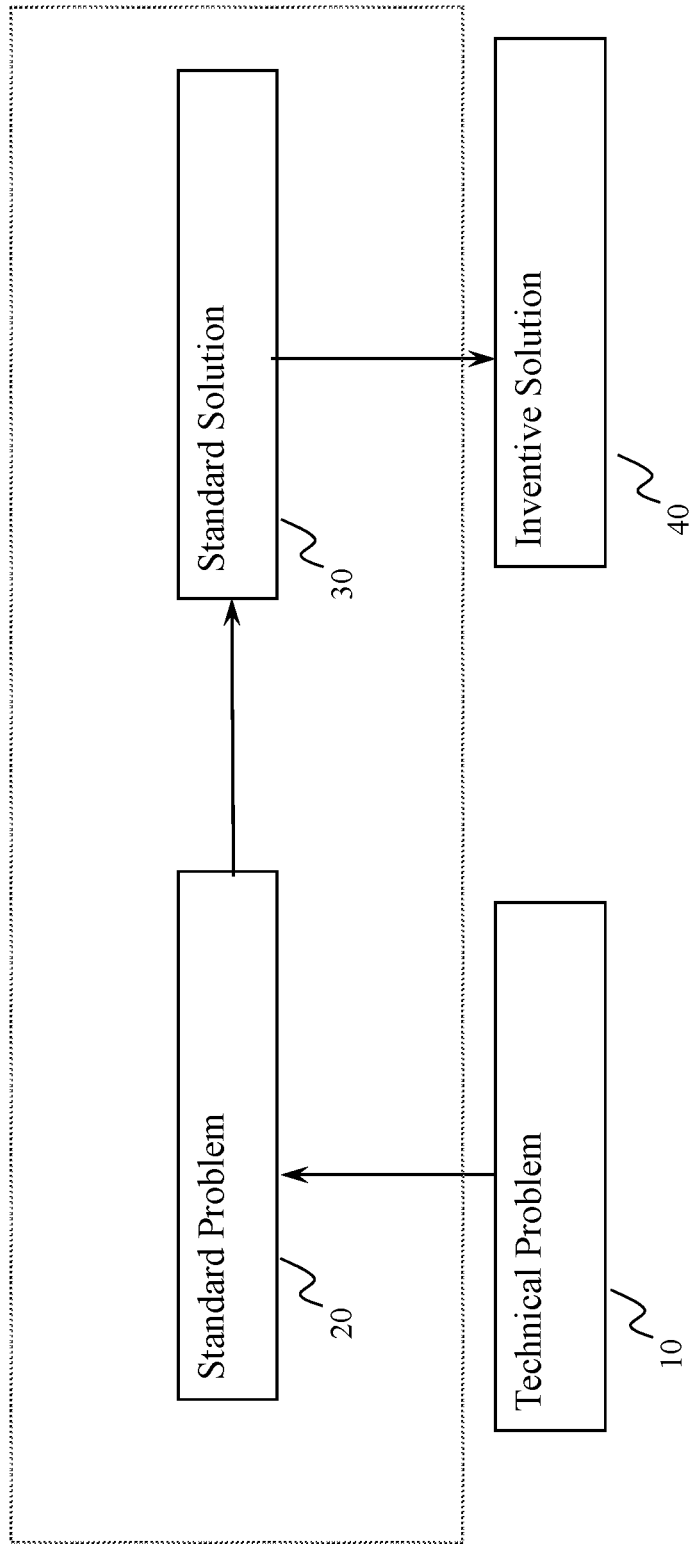
FIG. 1 is a schematic a diagram of the TRIZ methodology for technical problem solving using abstract representations of the problem and solution.
Figure 2:
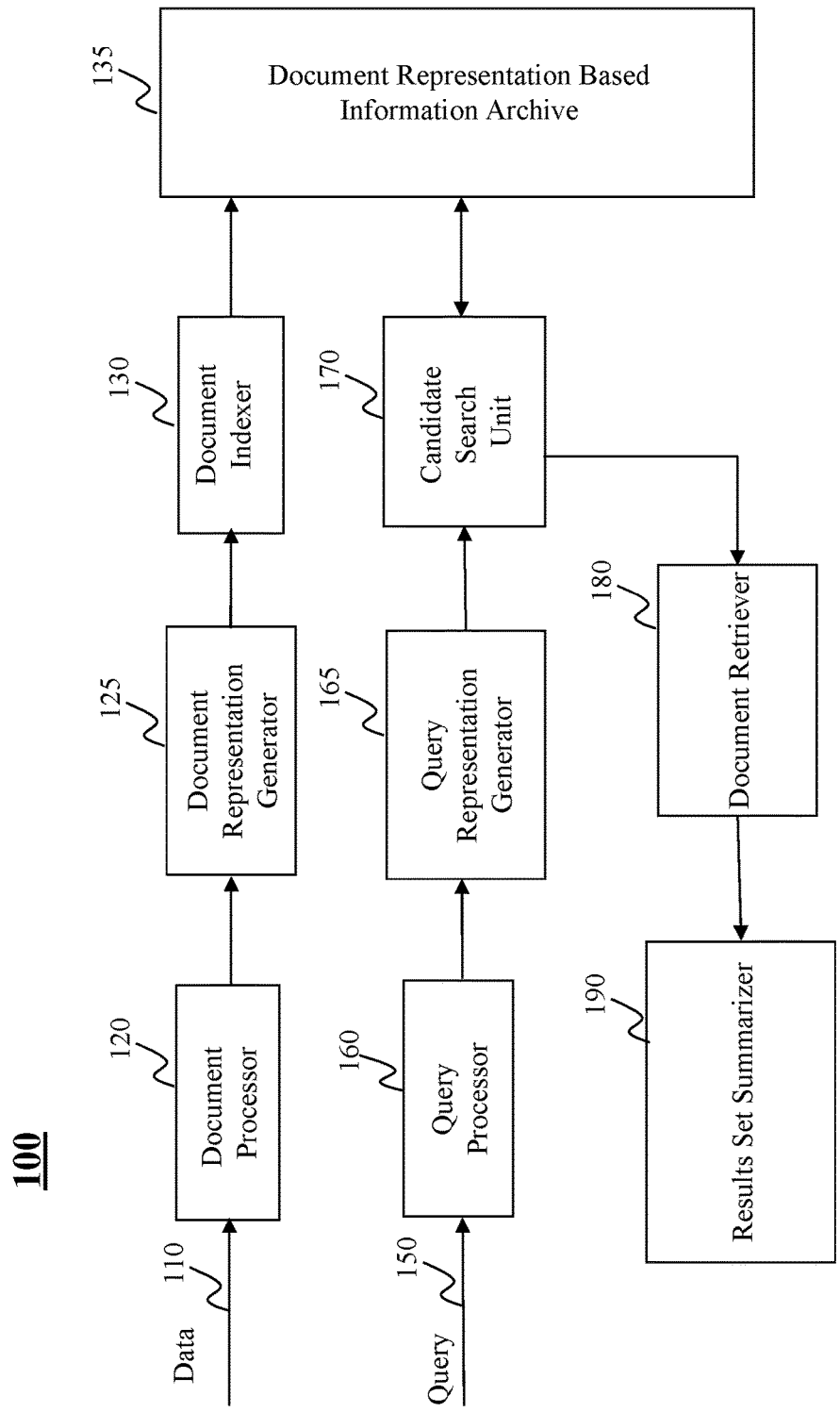
FIG. 2 is a schematic diagram of a generic semantic search engine, with the ability to compare a query to a set of document data and generate a document index of the most semantically relevant results.

Adverting now to FIG. 2, which depicts an exemplary schematic diagram of a Semantic Search System 100 for a method, system, apparatuses and programs for performing an information search and retrieval. As shown in FIG. 2, a set of documents, referred to collectively as Data 110 is received and is processed by a Document Processor 120 to create a feature-based vector for each document of the set. Typically, the documents of the document set 110 include patents, non-patent technical literature and the like, but can include any text-based documents that contain useful and relevant information for solving a perceived or technical problem or proposed solution (also collectively referred to as a technical problem). A unified representation is then created based on the feature-based vector, that integrates semantic and feature based characterizations of the document by the Document Representation Generator 125 to produce a set of feature-based vectors that characterizes the documents. The feature-based vectors are indexed by a Document Indexer 130 and the results are stored in a Document Representation Based Information Archive 135, e.g., a non-transitory computer readable storage medium.

A query 150 is received and is processed by a Query Processor 160 and Query Representation Generator 165 to generate a feature-based vector that characterizes the query. A unified representation of the query is then created based on the feature-based vector, that integrates semantic and feature based characterizations of the query by the Query Representation Generator 165.

The Candidate Search Unit 170 compares the query unified representation to the document unified representations stored in the Document Representation Based Information Archive 135 to identify the documents indexed in the data Archive 135 that are related to the query. The degree of similarity between the documents and the query are used to by the Document Retriever 180 to produce a ranked list of documents that are semantically related to the query.

A results set summarizer 190 performs linguistic analysis on the content of the indexed documents, e.g., breaking sentences into smaller units such as words, phrases, etc. Frequently used words, such as grammatical words "the" and "a", may or may not be removed. The results set summarizer 190 further produces an ordered set of keywords or Result Concepts Terms. The keywords are prioritized by semantic relevance or count of occurrences of each keyword in each of a plurality of documents containing the word or any other method that provides the most relevant keywords first in a list of keywords. The keyword can be stored using an existing database management system (e.g., DBMS) or any commercially available storage means.

TABLE 1

A list of tools available from TRIZ for problem solving

*40 inventive principles-conceptual solutions to technical and physical contradictions.
*76 Standard solutions-for solving system problems without the need of identifying contradictions.
Effects database-which includes about 2500 concepts extracted from the body of engineering and scientific knowledge and applied to problem solving.
Separation principles-for understanding and solving physical contradictions and points at solutions from the inventive principles relevant to the problem.
Contradiction matrix-a matrix of 39 technical parameters that are arranged on the vertical and horizontal axis to interact with one another.
*Patterns of evolution of technical systems-for identifying directions of technology development explained earlier.
IFR and ideality-an arbitrary system that has all its parts performing at the greatest possible capacity.
Fitting-this is the process of taking a step back from the IFR (which is a conceptual and unachievable ideal) into a realistic 'strong' solution within the constraints of the TABLE 1-continued A list of tools available from TRIZ for problem solving present real-life conditions (Altshuller, 1996).
Function analysis-for understanding the interactions between all the components of the system and to draw out the problems arising from the interactions.
Substance field (Su-field) analysis-similar to function analysis, helping to map out the entire system and point exactly to problems without adding unnecessary details
Analysis of system resources-this is the systematic search and analysis of resources within and outside the system to the benefit of the problem situation so that solutions identified are as close as possible to the ideal final result (IFR).
Nine windows (also known as inventive system thinking or system operator or multi-screen diagram of thinking)-used to understand the problem or a technical system in terms of the context (or environment) in which it exists and the details of the parts within the system itself. Helps to understand how the problem (its context and details) may change over time, which is useful for locating solutions.
Creativity tools-for overcoming psychological inertia (mental habits which prevent innovation, clarity of thought and thinking outside the box). These tools include size-time-cost and method of little men (otherwise known as 'smart little people').
ARIZ (the Algorithm for Inventive Problem Solving)-a series of steps utilizing an array of TRIZ tools (some of which are explained above) for finding solutions and innovations. It is reported to be most suitable for difficult and complicated problems.

Figure 3:
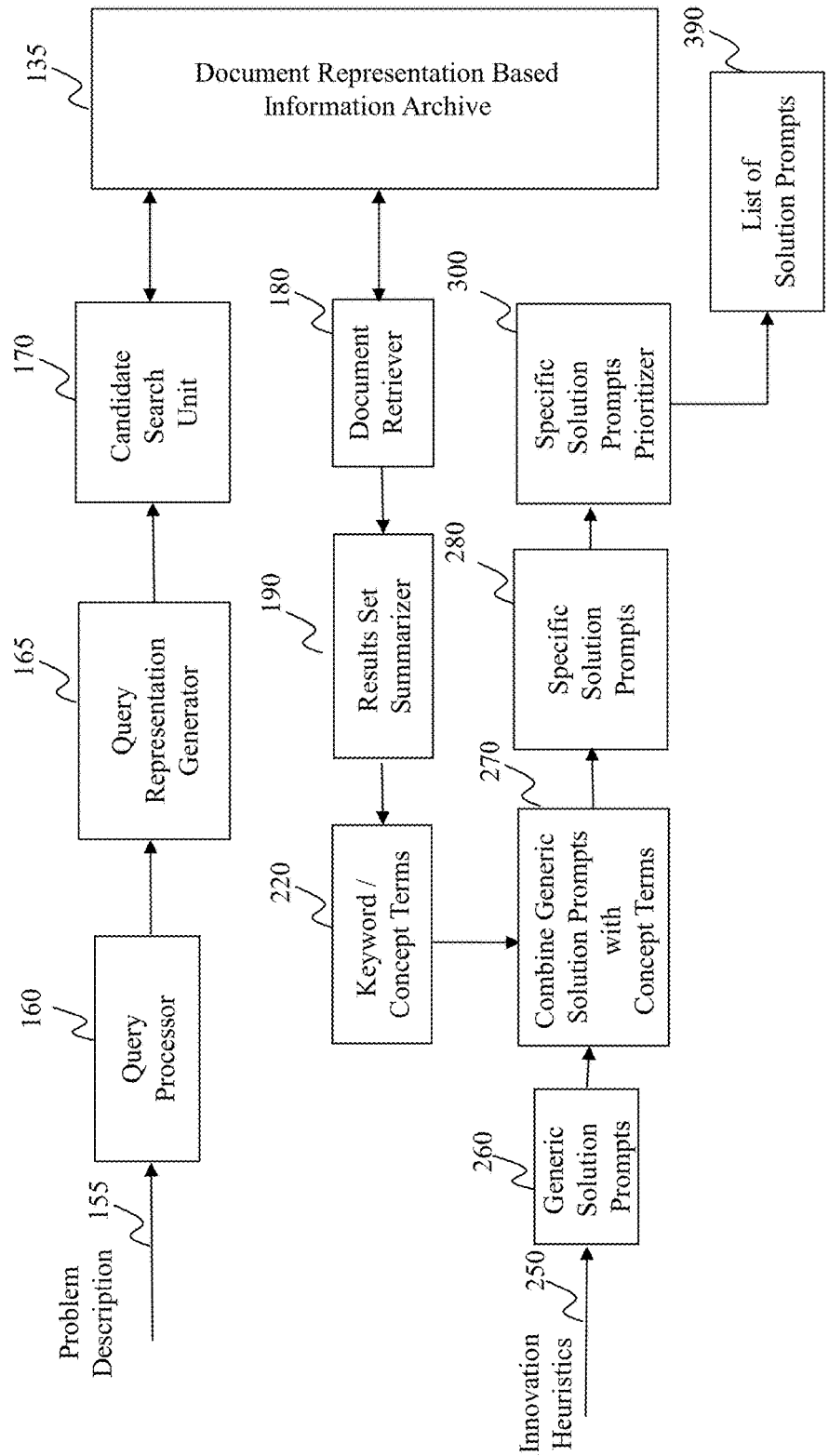
FIG. 3 is a schematic diagram of a process flow according to embodiments of a system and a method for generating a Solution Prompt.

Adverting now to Table 1, which is a list of tools available from TRIZ for problem solving. As may be appreciated from Table 1, the TRIZ corpus can be somewhat complicated and difficult to master—even by those with significant expertise and experience in applying the TRIZ protocols. Three of the tools (marked with an asterisk) comprise lists of generic recommendations or heuristics that can be applied to technical problems. These lists represent some of the abstract solutions 30 that are part of TRIZ. Finding the correct abstract solution to apply to a standard problem 20 is not too difficult and tools, such as the conflict matrix, are designed to facilitate finding of the abstract solution. However, finding the best representation of the Standard Problem 20 to connect to the perceived Technical Problem 10, and figuring out how to translate the Standard Solution 30 into the actual Solution to the Technical Problem can be exceedingly challenging and problematic—this is one or the reasons it takes years of training to become a TRIZ expert. Adverting now to FIG. 3, which illustrates a solution that alleviates the aforementioned problems by reducing the need for significant or specialized TRIZ training. As shown in FIG. 3, a neural-network based semantic analysis of the problem statement when presented as a Query 150 (See FIG. 2) provides a mechanism for combining the keywords or concept phrases or topic descriptions that are most relevant to the technical problem, with the 40 Inventive Principles and 76 Standard Solutions and Patterns of Evolution from TRIZ, for purposes of providing concrete recommendations or specific Solution Prompts that lead to specific solutions without having to perform the TRIZ Conceptual analysis that is so difficult for most individuals and engineers.

As shown in FIG. 3, a system 200 according to the instant disclosure for inventive problem solving, etc., combines TRIZ heuristics with semantic search abilities (See, e.g., U.S. Pat. No. 8,548,951). A query, which in this case is shown as Problem Description 155, describes an inventive situation or environment that can include, perhaps, one or more proposed solutions that have issues such as technical conflicts that prevent implementation of a solution, is received and is processed by Query Processor 160 and Query Representation Generator 165 to generate a feature-based vector that characterizes the Problem Description query. A query unified representation of the Problem Description is then created based on the feature-based vector, that integrates semantic and feature based characterizations of the query by the Query Representation Generator 165.

The Candidate Search Unit 170 compares the query unified representation to the document unified representations stored in the Document Representation Based Information Archive 135 to identify the documents indexed in the data archive 135 that are related to the Problem Description. The degree of similarity between the identified documents and the query are used by the Document Retriever 180 to produce a list of documents that are semantically related to the Problem Description.

A Results Set Summarizer 190 generates a list of Keyword or Concept Terms or phrases that are derived from the list of documents semantically related to the Problem Description. In this step in the process, a set of Concept Terms will be used to transform the abstract recommendations of TRIZ into concrete recommendations that lead to Specific Solution Prompts. The Results Set Summarizer 190 chooses keywords, concept terms and phrases from the document results set by relevance or a number of occurrences of each keyword in each of a specified plurality of documents, or by any other natural language processing technique for analyzing the relationships between one or more documents and the terms they contain to produce a set of concepts related to the documents, and stores this information in Keyword/Concept Terms Storage 220. The Keyword/Concept Terms Storage 220 can be implemented using an existing database management system (e.g., DBMS) or any commercially available database.

In this exemplary embodiment, the system 200 also has stored in storage media, Innovation Heuristics, such as a list of Generic Solution Prompts 260 (e.g. TRIZ Inventive Principles, Standard Solutions and Patterns of Evolution lists, etc.). Each of these come in the form of short declarative statements that are made generic by the use of abstract place holders (e.g. "component object") that represent some part of the technical system that is to be improved. Several examples of these statement are provided in Table 2. Note that some of the statements do not have place holders for component objects, that is optional and does not change the rest of the process.

TABLE 2

Divide the {component object} into independent subsystems.
Combine {component object}'s performing the same, like, or related functions.
Make the {component object} porous or use supplementary porous elements (inserts, covering.)
Set the {component object} in oscillating motion.
Introduce a feedback.

The Combine Generic Solution Prompts with Concept Terms 270 step creates the Specific Solutions Prompts 280, which are specific, concrete and highly relevant proposed solutions to the technical problem, i.e., they are non-abstract. In this step, the Generic Solution Prompts 260 are combined with a list of Keyword/Concept Terms, using a join function (also known as morphological analysis) where all possible combinations are generated. For example, when combining 30 Inventive Principles that have placeholders for component objects with 10 Concept Terms a list of 300 Solutions Prompt is generated.

The final steps in the process are described in detail in FIG. 4, but briefly, the hundreds of Specific Solutions Prompts 280 are prioritized by a Specific Solutions Prompt Prioritizer 300 using a scoring system, and the List of Solution Prompts 390 can be presented to a user in an ordered manner, one item at a time starting with the most relevant solution for consideration when brainstorming new inventive solutions, or alternatively, as will be described later, the List of Solution Prompts 390 can be randomized and presented in an stochastic order.

Figure 5A:
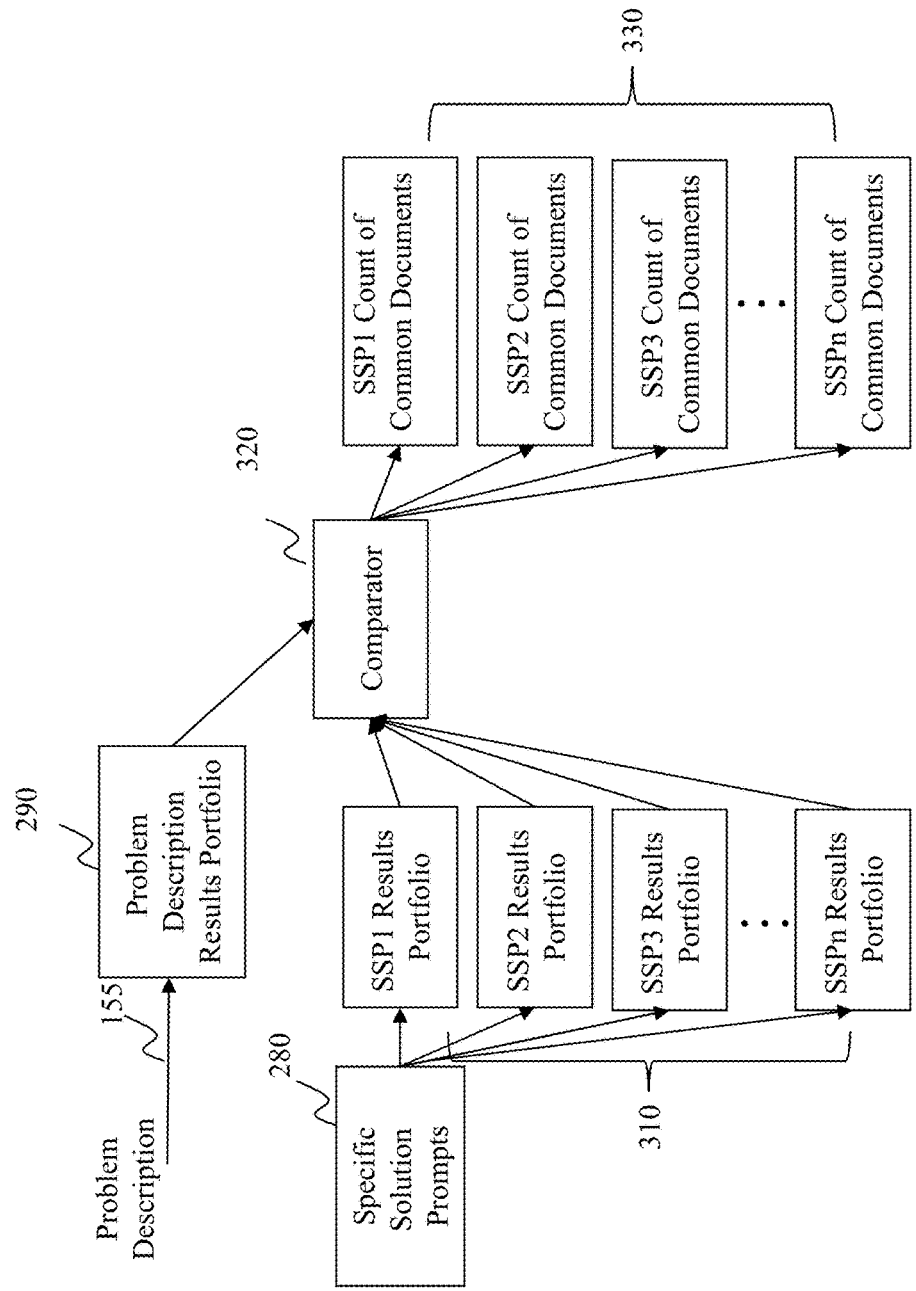
FIGS. 5 A-B are schematic diagrams of a process flow for scoring a set of Specific Solution Prompts.

Adverting now to FIG. 5A, which depicts an exemplary high-level schematic diagram of the Specific Solutions Prompt Prioritizer 400, which uses elements of the Semantic Search System 100 to score and prioritize the list of Specific Solutions Prompts 390. The process begins with the Specific Solution Prompts 280 that were generated in step 270 from the Generic Solutions 260 and the Keyword/Concept Terms (See FIG. 3). Each of the respective Specific Solution Prompts 280 are utilized as a query and are analyzed by the Semantic Search System 100 described earlier (See FIG. 2). For each Specific Solution Prompt 280, one or more documents is generated, referred to as the Prompt Results Portfolio 310, which one or more documents are most closely related semantically to the respective Specific Solutions Prompts query. In an embodiment, the Specific Solutions Prompts Results Portfolio 310 includes the most relevant 2500 documents returned as a result of the semantic analysis of the Specific Solution Prompts 280. Also, the original Problem Description 155 is analyzed to produce another set of one or more documents, the Problem Description Results Portfolio 290, which one or more documents are semantically most closely related to the Problem Description query 155. In a preferred embodiment, the Problem Description Results Portfolio 290 includes the most relevant 2500 documents. A Comparator 320 examines both portfolios, 290 and 310, to see how many documents are commonly contained in both portfolios. The resulting value of documents commonly contained in each portfolio can be used as a measure of the relevance of the analyzed respective Specific Solution Prompts 310 and will be used to prioritize the results.

Another measure used to prioritize the results is the total number of relevant results from the Document Representation Based Information Archive 135 that are relevant to a query based on the respective Specific Solution Prompts 280. There are various ways to define whether a document is relevant to the search query. In a preferred embodiment, as disclosed in U.S. Pat. No. 8,548,951 (R. Solmer and W. Ruan), a cosine similarity can be computed between the semantic code of the query and semantic code of each of the plurality of documents. A KL divergence may then be calculated between the residual keyword vector of the query and the residual keyword vector of each of the plurality of documents. The final similarity score used for ranking the matched documents can be a weighted sum of the cosine similarity and KL divergence distance measures. If the sign of the final similarity score is positive, then the document is considered to be relevant. This value, the Count of all Relevant Documents 340, is a measure of the sensibility of the respective Specific Solution Prompts 310. In cases where a Specific Solution Prompt 280 is non-sensical, e.g., the combination of a keyword with an abstract phrase is not a good fit, a low count is found, and the suggestion is suppressed.

The Count of Common Documents 330 and the Count of All Relevant Documents 340 are combined in a Solutions Prompt Scorer 350 to create an overall estimate of the likelihood that a particular Specific Solution Prompt 280 will be useful and should be presented to the user. The presentation of the Specific Solution Prompts 280 can be performed one at a time as it is important that the user has an opportunity to reflect on each suggestion to determine how the inventive system may be changed to bring about improvements and solve problems. That is, presenting the entire list of Specific Solution Prompts at once can be counter-productive and overwhelming. Accordingly, there are at least two main manners by which a list of Specific Solution Prompts may be presented. The first, is to simply display the list from the highest scoring Specific Solution Prompts to the lowest scoring Specific Solution Prompts. The second option, referred to as the Score Weighted Randomizer 360, is to user a random number generator so as to randomly display one or more Specific Solution Prompts from the list in a weighted manner. That is, a probability of a Specific Solution Prompt being displayed can be weighted by the Solution Prompt Score such that higher scoring Specific Solution Prompts are more likely to be displayed to a user, but potentially any of the Specific Solution Prompts from the list of Specific Solution Prompts may be displayed to a user. Optionally, the weighted random selection for each turn can be from all of the Solution Prompts or only from those that have not been presented yet, thereby preventing the same suggestion from being presented more than once.

FIG. 5A illustrates a scoring process 400 used for Specific Solutions Prompt Prioritization. These steps are included in the dashed line in FIG. 4. In the scoring process, a problem description results portfolio 290 created from the original problem description 250 is compared to a Results portfolio 310 created from each of the respective Specific Solution Prompts 280. For purposes of illustration, it is assumed that there are n Specific Solution Prompts in the list of all Specific Solution Prompts 280, referred to in FIG. 5A as SSP1, SSP2, SSP3 . . . SSPn. For each SSP, the Semantic Search System 100 creates a respective SSP Results portfolio, SSP1 Results Portfolio, SSP2 Results Portfolio, SSP3 Results Portfolio . . . SSPn Results Portfolio, referred to collective as Results Portfolio 310. A Comparator 320 examines the intersection of both the Problem Description Results portfolio 290 with each of the SSP Results Portfolios to produce a respective set of scores referred to as SSP1 Count of Common Documents, SSP2 Count of Common Documents, SSP3 Count of Common Documents . . . SSPn Count of Common Documents, referred to collectively as 330. Each value 330 is a measure of the relevance of the respective Specific Solution Prompt being scored and can be used to prioritize the results.

Figure 5B:
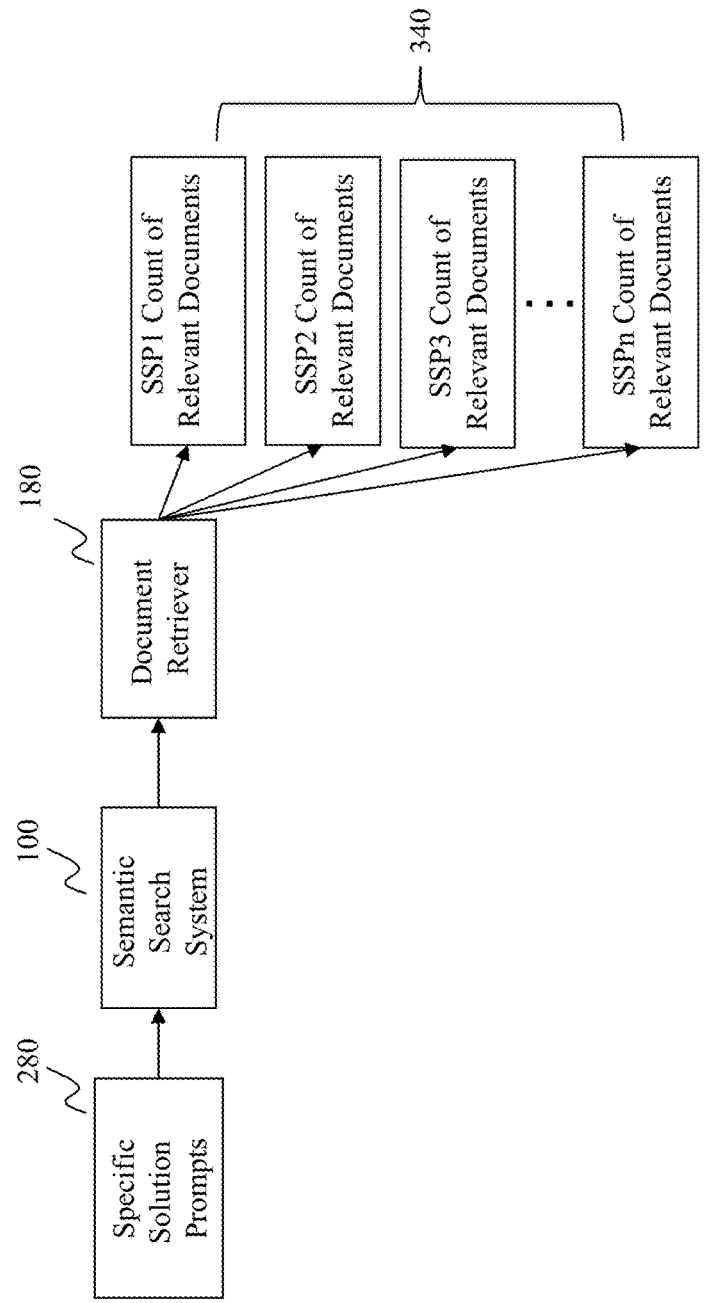

FIG. 5B illustrates the details of the a second scoring step 400 used for Specific Solutions Prompt Prioritization. This second score is based on the total number of relevant results from the Document Representation Based Information Archive 135 that are relevant to a query based on the respective Specific Solution Prompts. Each of the Specific Solution Prompts in the list of Specific Solution Prompts 280 is searched individually as a query by the Semantic Search System 100, which includes a Document Retriever 180 that can provide a list of relevant documents from the document archive 135 or, in this case, simply a count of how many relevant documents are found. This is done for each respective Specific Solution Prompt to produce a set of values 340, the SSP1 Count of Relevant Documents, the SSP2 Count of Relevant Documents, the SSP3 Count of Relevant Documents . . . the SSPn Count of Relevant Documents Count. Each value 340 is a measure of the sensibility of the respective Specific Solution Prompts, because where combinations of a keyword and an abstract phrase is not a good fit, a low count is is likely to occur, and the suggestion can be suppressed.

Figure 6:
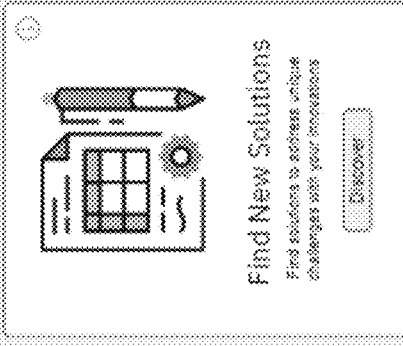
FIG. 6 is an illustration of an exemplary embodiment of a graphical user interface in accordance with the instant disclosure.
Figure 6:
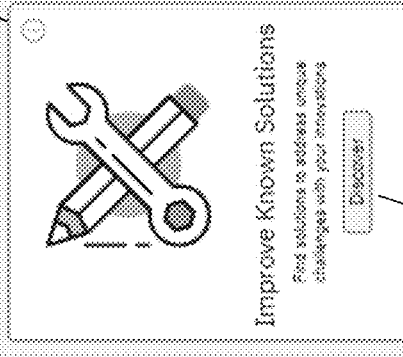
Figure 6:
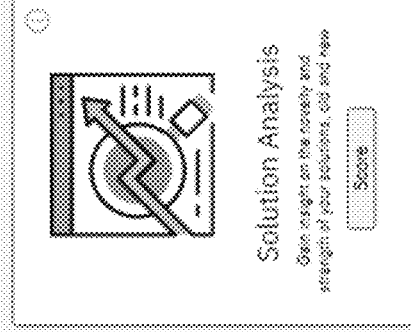
Figure 6:
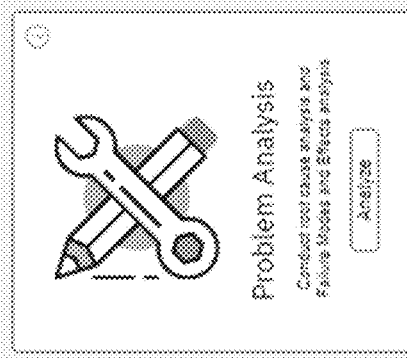

Referring now to FIG. 6, which illustrates a graphical user interface 500, as may be displayed on an electronic display device or monitor of a system in accordance with the instant disclosure, for operating the systems and methods according to the instant disclosure. An overall graphical user interface 500 is shown as including a background 405, and a foreground 410, which includes one or more interactive problem-solving software modules, e.g., "Problem Analysis", "Solution Analysis", "Improve Known Solutions", "Find New Solutions", etc., of the graphical user interface 500. There are several possible modules which can be applied, but for expediency, the instant disclosure will hereinafter only discuss the "Improve Known Solutions" module 415, which can be launched by selecting interactive virtual button 420.

Figure 7A:
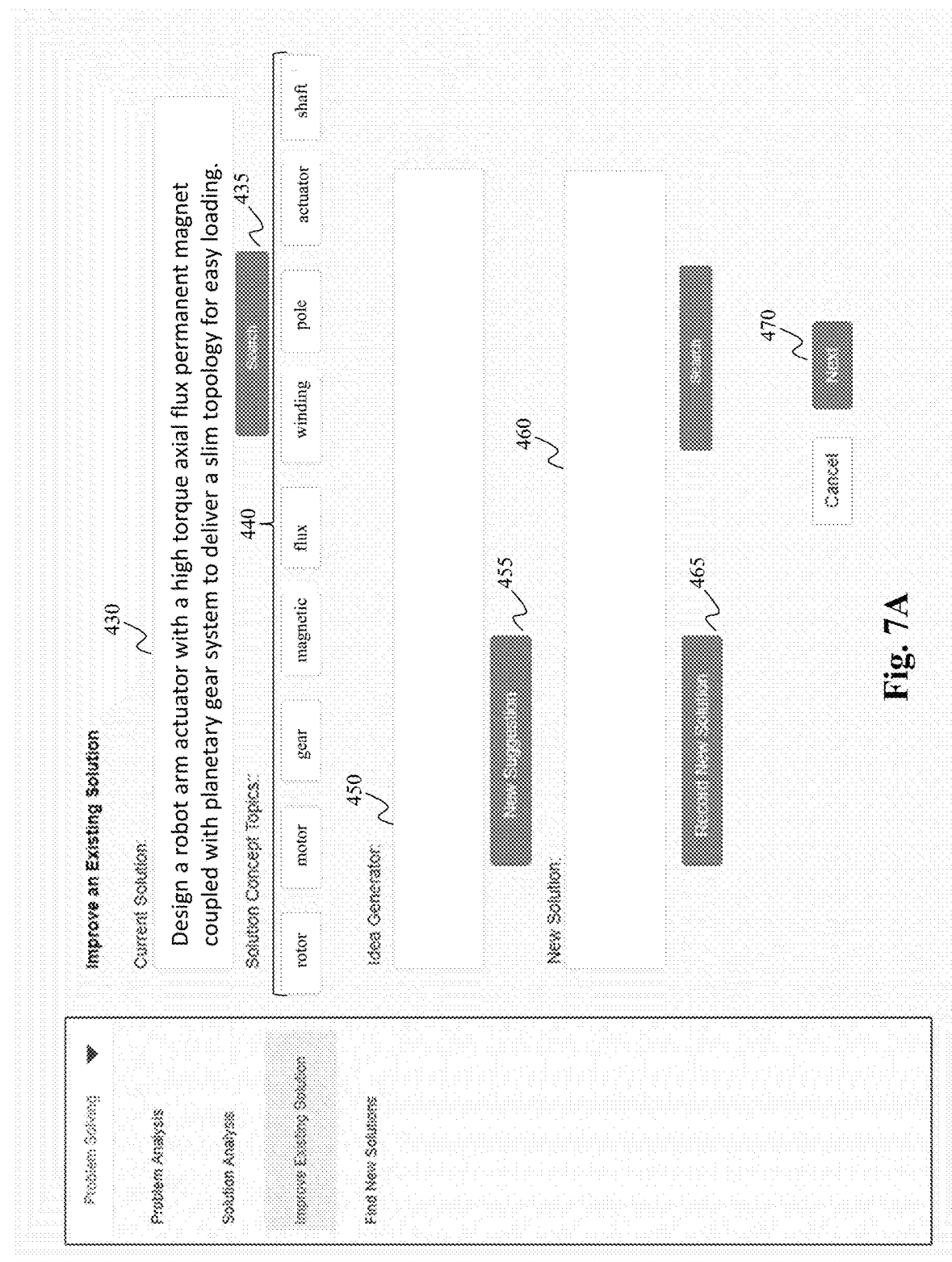
FIGS. 7 A-C are illustrations of an exemplary embodiment of a graphical user interface in accordance with the instant disclosure, which depicts the generation and display of an automated Solution Prompt.
Figure 7B:
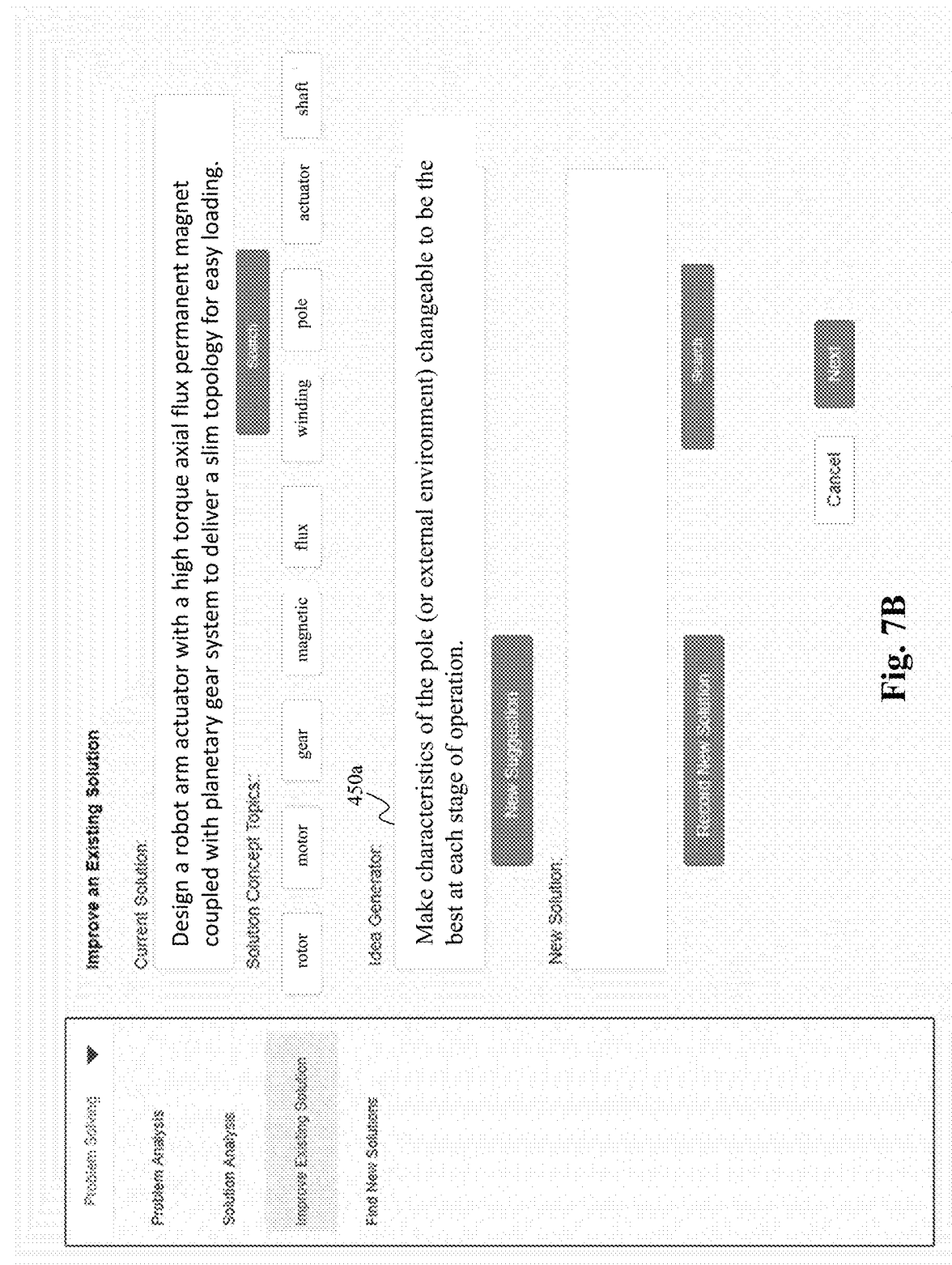

Upon selecting the interactive virtual button 420, the graphical user interface(s) of FIGS. 7A-7C can be displayed. FIGS. 7A-C depict several steps as information is progressively displayed as described hereafter. Initially, when a user is directed to the screen of FIG. 7A as a result of selecting virtual button 420 of FIG. 6, the various input fields 430, 440, 450, 460, etc. are empty until that time when the user inputs a description of a technical problem/solution into input field 430. When this is accomplished and the user selects search icon 435, the system according to the instant disclosure undertakes process 200 of FIG. 3 so as to executed by the semantic search engine 100 and produce a list of keywords. As shown in FIG. 7A, due to the fact that a user has input a query into field 430 and selected search button 435, a number of keywords 440 most semantically relevant to the input query are displayed to the graphical user interface. It should be appreciated that while FIG. 7A shows that a total of nine (9) most relevant results (e.g., keywords) have been displayed to the display, the instant disclosure is not limited to displaying only nine (9) keywords, and the number of relevant results displayed may be defined by a user.

Figure 4:
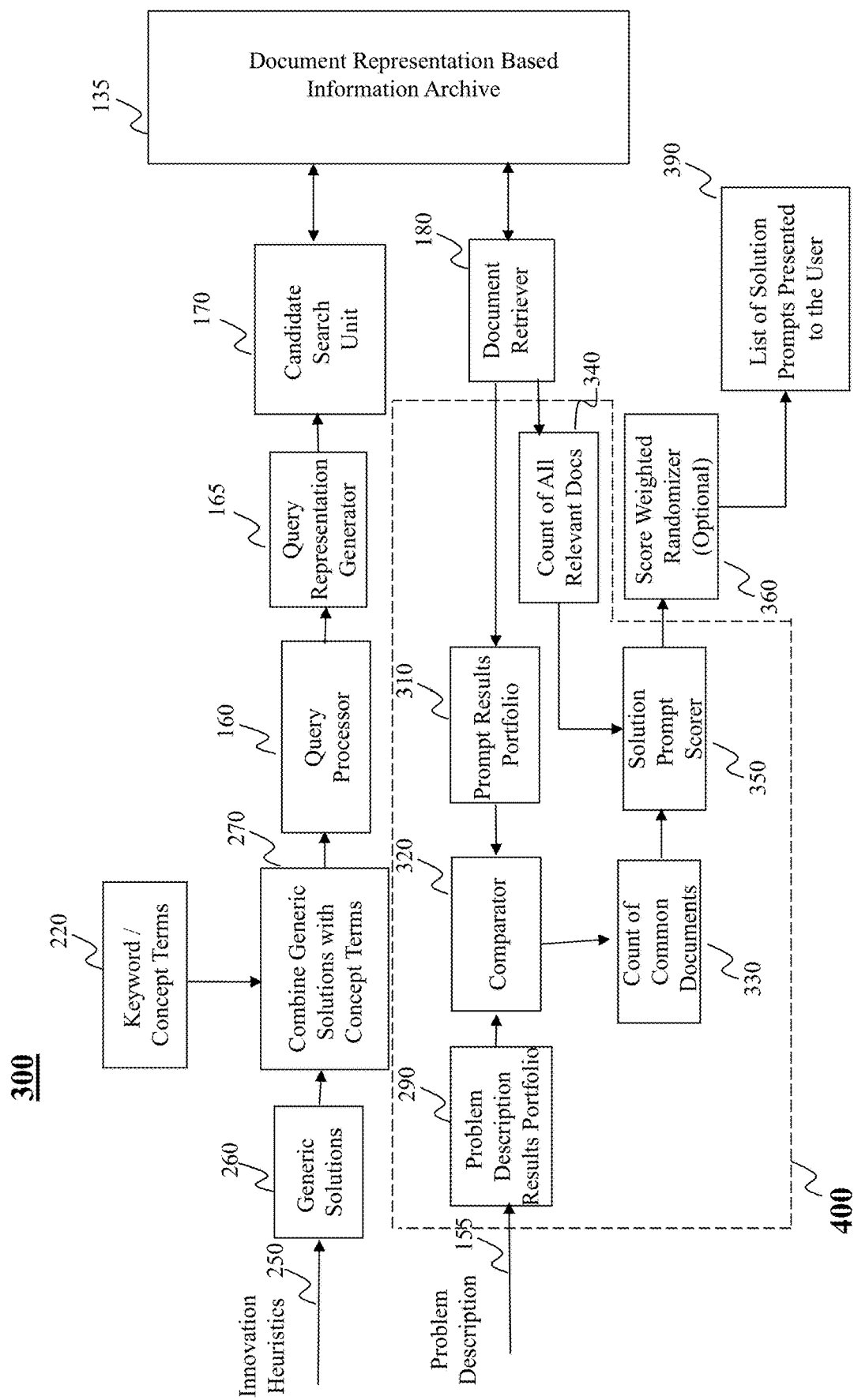
FIG. 4 is a schematic diagram of a process flow according to embodiments of a system and a method for selecting from a list of possible Solution Prompts.

Once the semantic search engine has displayed a number of results or keywords, the system is now ready to present to the display, one or more Specific Solution Prompts based on a combination of the TRIZ corpus and the keywords— this is accomplished by the systems 300/400 and processes previously described and illustrated in FIGS. 4-5B. That is, when a user selects the interactive virtual input button 455, e.g., "New Suggestion", the systems 300/400 retrieve one or more Specific Solution Prompts and displays it to the graphical user interface in field 450. As shown in FIG. 7B, because a user has selected the "New Suggestion" button, the first Specific Solution Prompt of "Make Characteristics of the pole (or external environment) changeable to be the best at each stage of operation" 450a is displayed in field 450. Where a user selects the "New Suggestion" input button 455 once again, a new Specific Solution Prompt 450b is displayed to filed 450 as shown in FIG. 7C. If the virtual input button 455 is repeatedly selected, further Specific Solution Prompts may be displayed to the user. In other words, each very time the "New Suggestion" input button 455 is selected, a new Specific Solutions Prompt is presented to the user. The user may read a Specific Solution Prompt, reflect upon how it may be applied to the current technical system or problem, and then input information into the "New Solution" field 460, and then select the "Record New Solution" button 465, which records the input information into a storage area or memory and clears filed 460 so that other information (e.g., concepts, ideas, etc.) based on the same Specific Solution Prompt can be recorded. Alternatively, button 455 can be selected pressed to display a new Specific Solution Prompt. The entire process can continue to iterate for as long as the user desires, until the user selects the "Next" button 470, which displays other routines, including a report generator that will create a report of all the recorded solutions, or ends the process.

Note that in an embodiment, the Specific Solution Prompts can be ranked according to score and presented in a ranked sequential order as may be defined by a user, i.e., lowest to highest score/highest to lowest score, etc. In such case, each Specific Solution Prompt can be presented once starting from the beginning of the list to the end of the list. In the current implementation, the list can include some 500 Solution Prompts, so a user may rarely reach the end of the list. At the end, an informational message can be displayed indicating the same and, and the software can automatically continue from the top of the list.

In other embodiments, a random number generator can be used to select one Specific Solution Prompt from among all of the possible Specific Solution Prompts. In such case, Score Weighted Randomizer 360 having a probability of selecting a given suggestion that is proportional to the ratio of the score for each respective Specific Solution Prompt and the sum of the scores of all the Specific Solution Prompts. Optionally, some higher scoring Specific Solution Prompts can be selected more than once, and other, typically lower scoring Specific Solution Prompts, may not be selected at all. However, due to the creative process and the ability of individuals to quickly perceive patterns, this stochastic process is more effective at stimulating solutions, and users may examine more Specific Solution Prompts and generate more new solution ideas than compared to the embodiment wherein Specific Solution Prompts maybe sequentially displayed. Or, optionally, each Specific Solution Prompt may only be presented once. If a previously selected Specific Solution Prompt is randomly chosen, the system can skip to the next Specific Solution Prompt until a suggestion that has not yet been displayed in a session is selected.

The system and methods can further include one or more mechanisms to track the Specific Solution Prompts presented to the user and track user interactions with each of Specific Solution Prompts, which includes but is not limited to review, time spent reviewing before moving on to the next Solution Prompt, number of new solution candidates created after review before moving on the next Solution Prompt. The system allows the user to go back and forth on already presented Specific Solution Prompts and learns the presentation rate and the probability of success for each type or class of Inventive Principles, heuristic, separation techniques, or Standard solutions underlying the generic Solution Prompt from which the respective Specific Solution Prompt was constructed, and adjusts the prioritization strategy as the user proceeds. For example, the scores of certain Specific Solution Prompts will be reduced dynamically if the user keeps ignoring the class of generic Solution Prompt from which the respective Specific Solution Prompt was constructed even though their initial scores could be high. Certain types of Solutions that are not presented initially, after some time will be given a chance to be presented to the user. This tracking and learning mechanism can work across the boundaries of queries and users, which ends up building a concept/principle relationship network database. The network not only links concepts to generic Solution Prompts, principles, heuristics, techniques or standard solutions with probabilities, but also includes the interactions among the principles/techniques/solutions coupled with specific concepts. For example, one type of concept/principle couple often leads to another concept/principle couple. This knowledge learned from user interactions can be applied to other users with similar context.

Figure 8:
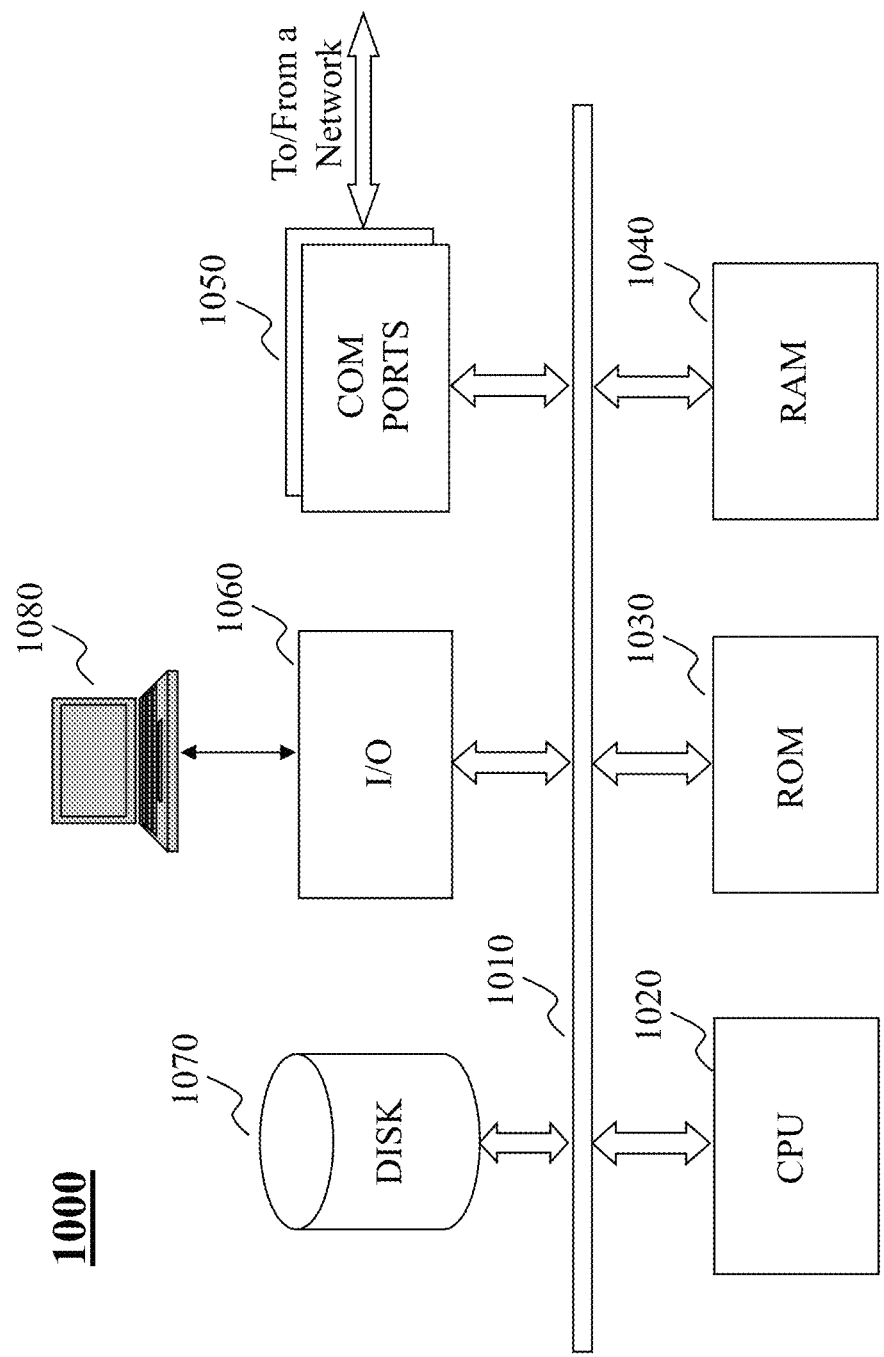
FIG. 8 is a schematic illustration of an exemplary system architecture configured to implement specialized systems and methods according to the instant disclosure.

FIG. 8 depicts an architecture on which the teachings of the instant disclosure may be implemented and realized and includes a functional block diagram illustration of a computer hardware platform which includes user interface elements. Computer 1000 may be a general-purpose computer or a special purpose computer and can be used to implement any component of the present teachings, as described herein. For example, the present teachings may be implemented on a computer such as computer 1000, via its hardware, one or more software programs, firmware, or combinations thereof. Although only one such computer is shown, for convenience, the computer functions relating to the present teaching as described herein may be implemented in a distributed fashion on a number of similar computer platforms, to, for example, distribute processing load. Examples of computers and computer systems, environments, and/or configurations that may be represented by the components illustrated in FIG. 8 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

The computer 1000, for example, includes one or more communications units 1050 connectable to and from a network connected thereto to facilitate data communications. Communications units can include network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computer 1000 through communications unit 1050 (i.e., via the Internet, a local area network, or other wide area network). From communications unit 1050, software, program software and data can be loaded onto a non-transitory computer readable medium, such as storage device 1070.

The computer 1000 also includes a central processing unit (CPU) 1020, in the form of one or more processors, for executing program instructions stored on a non-transitory computer readable storage medium. The exemplary computer platform includes an internal communication bus 1010, program storage and data storage of different forms, e.g., data storage device 1070, read only memory (ROM) 1030, or random access memory (RAM) 1040, solid state hard drives, semiconductor storage devices, erasable programmable read-only memories (EPROM), flash memories, or any other computer readable storage media that is capable of storing program instructions or digital information for various data files to be processed and/or communicated by the computer, as well as possibly program instructions to be executed by the CPU. The computer 1000 also includes an I/O component 1060, supporting input/output flows between the computer and other components therein such as user interface elements 1080 (e.g., a display device/monitor, and one or more input devices such as a keyboard, mouse, touchpad, touchscreen, speaker, microphone, etc.). The computer 1000 may also receive programming and data via network communications.

Hence, aspects of the methods and processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, solid state drives, disk drives and the like, which may provide storage at any time for the software programming.

All or portions of the programming and/or software may at times be communicated through a network such as the Internet or various other communications networks. Such communications, for example, may enable loading of the programming and/or software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of machine or computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it/they may also be implemented as a software only solution, e.g., an installation on an existing server. In addition, the systems, methods and processes may be implemented as firmware, firmware/software combination, firmware/hardware combination, or a hardware/firmware/software combination.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer or entirely on the remote computer or server. In the latter scenario, the remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present teachings are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following Examples describe results presented upon operation of the systems and processes according to the instant disclosure, and user operation of the graphical user interface of FIGS. 6-7B:

Example 1 (See, e.g., FIG. 7A)

Current Solution 430:

Design a robot arm actuator with a high torque axial flux permanent magnet coupled with planetary gear system to deliver a slim topology for easy loading.

Key word list 440 (note that many of the presented keywords do not appear in the original solution query. Instead, the key words are derived from the result documents after the semantic search): Rotor, motor, gear, magnetic, flux, winding, pole, actuator, shaft, rotate, machine, permanent magnet, axial, drive, coil, speed, state, power, rotation Sample of the top 20, in sequential order, Specific Solutions Prompts constructed by system 200 using the first 10 keywords generated and 50 TRIZ inventive principles, similar to those shown in Table 2:

Charge the pole with a force that is opposite to the direction of the working force.

Support the gear by its interaction with the environment causing upward force.

Charge the actuator with a force that is opposite to the direction of the working force.

Charge the rotation with a force that is opposite to the direction of the working force.

Charge the rotate with a force that is opposite to the direction of the working force.

Make characteristics of the pole (or external environment) changeable to be the best at each stage of operation.

Charge the gear with a force that is opposite to the direction of the working force.

Make characteristics of the gear (or external environment) changeable to be the best at each stage of operation.

Prepare safety measures to compensate for the relatively low reliability of magnet in advance.

Make characteristics of the actuator (or external environment) changeable to be the best at each stage of operation.

Make fixed parts of the magnetic or environment movable and make moving parts of the object or environment immovable.

Prepare safety measures to compensate for the relatively low reliability of pole in advance.

Charge the magnetic with a force that is opposite to the direction of the working force.

Make characteristics of the rotate (or external environment) changeable to be the best at each stage of operation.

Make all parts of the actuator operate at full power and without a break.

Prepare safety measures to compensate for the relatively low reliability of gear in advance.

Change the pole's phase.

Change the gear's degree of flexibility.

Make fixed parts of the rotor or environment movable and make moving parts of the object or environment immovable.

Change the gear's phase.

Example 2

Current Solution 430:

How to design an out-patient interactive stroke therapy system that empowers and supports a patient's recovery at home in order to immediately start improving brain function and improve the stroke patient's fine-motor skills.

Key word list 440 (note that many of the keywords do not appear in the original solution query. Instead, the keywords are derived rom the result documents after the semantic search:

Rehabilitation, stroke, training, therapy, treatment, activity, clinical, report, brain, analysis, research, motor, significant, intervention, effects, evaluate, participant, trial, model, impair, outcome, limb Sample of the top 20, in sequential order, Specific Solutions Prompts constructed by system 200 using the first 10 keywords generated and 50 TRIZ inventive principles, similar to those shown in Table 2:

Support the brain by its interaction with the environment causing upward force.

Charge the brain with a force that is opposite to the direction of the working force.

Prepare safety measures to compensate for the relatively low reliability of brain in advance.

Support the rehabilitation by its interaction with the environment causing upward force.

Prepare safety measures to compensate for the relatively low reliability of rehabilitation in advance.

Change the brain's degree of flexibility.

Prepare safety measures to compensate for the relatively low of therapy in advance.

Make characteristics of the rehabilitation (or external environment) changeable to be the best at each stage of operation.

Place the rehabilitations in the best operating positions in advance and avoid wasting time for their delivery.

Make characteristics of the brain (or external environment) changeable to be the best at each stage of operation.

Prepare safety measures to compensate for the relatively low reliability of activity in advance.

Charge the rehabilitation with a force that is opposite to the direction of the working force.

Prepare safety measures to compensate for the relatively low reliability of clinical in advance.

Prepare safety measures to compensate for the relatively low reliability of stroke in advance.

Charge the activity with a force that is opposite to the direction of the working force.

Change the rehabilitation's phase.

Replace an expensive long rehabilitation by a set of cheap, short life or disposable rehabilitations.

Prepare safety measures to compensate for the relatively low reliability of training in advance.

Change the rehabilitation's temperature.

Replace an expensive long life brain by a set of cheap, short life or disposable brains.

Example 3

Current Solution 430:

How to design a suspension bridge supporting cable system that does not erode nor oxidize and at the same time does not exhibit galvanic reaction between the cable and struts.

Key word list 440 (note that many of the keywords presented do not appear in the original solution query. Instead, the keywords are derived from the result documents after the semantic search:

Coating, metal, polymer, material, layer, composition, about, stent, water, oxide, solution, temperature, agent, particle, reaction, substrate, alloy, corrosion, weight, acid, surface, implant, mixture, compound, electrode Sample of the top 20, in sequential order, Specific Solutions Prompts constructed by system 200 using the first 10 keywords generated and 50 TRIZ inventive principles, similar to those shown in Table 2:

Support the corrosion by its interaction with the environment causing upward force.

Charge the corrosion with a force that is opposite to the direction of the working force.

Prepare safety measures to compensate for the relatively low reliability of corrosion in advance.

Change the corrosion's temperature.

Use phenomena associated with phase changes of a substance. For example, change of its density and volume, heats of transformation, temperature of a substance during phase transition.

Prepare safety measures to compensate for the relatively low reliability of metal in advance.

Prepare safety measures to compensate for the relatively low reliability of stent in advance.

Change structure of the corrosion or environment from homogeneous to non-homogeneous.

Reject (discharge, dissolve, cut, fire, melt, evaporate, alter) the stent's part as soon as it has accomplished its function.

Charge the composition with a force that is opposite to the direction of the working force.

Make characteristics of the corrosion (or external environment) changeable to be the best at each stage of operation.

Establish the best operating conditions for each part of the metal.

Reject (discharge, dissolve, cut, fire, melt, evaporate, alter) the corrosion's part as soon as it has accomplished its function.

Change structure of the metal or environment from homogeneous to non-homogeneous.

Reject (discharge, dissolve, cut, fire, melt, evaporate, alter) the coating's part as soon as it has accomplished its function.

Reject (discharge, dissolve, cut, fire, melt, evaporate, alter) the layer's part as soon as it has accomplished its function.

Reject (discharge, dissolve, cut, tire, melt, evaporate, alter) the metal's part as soon as it has accomplished its function.

Place the corrosions in the best operating positions in advance and avoid wasting time for their delivery.

Reject (discharge, dissolve, cut, fire, melt, evaporate, alter) the polymer's part as soon as it has accomplished its function.

Reject (discharge, dissolve, cut, fire, melt, evaporate, alter) the composition's part as soon as it has accomplished its function.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implementable on a machine having at least one processor capable of communication with one or more non-transitory computer readable storage media, the machine capable of communicating via an electronic communications network, of analyzing one or more of a perceived or technical problem, or a proposed solution, and proposing a result, the method comprising:

receiving a first query describing the one or more perceived or technical problem, or proposed solution, as an input (155);

generating, by the semantic extractor, a unified representation of the first query based on at least one or more of at least one feature-based vector that integrates semantic and feature-based characterizations of the input (155);

retrieving (180) from a document archive (135) of the one or more non-transitory computer readable storage media, one or more documents that are most closely semantically related to the first query (155), the documents becoming a first portfolio (290) based on a threshold of similarity between unified representation of the first query and the unified representations of the documents;

obtaining (220), via a result set summarizer (190), a set of concept terms that are derived from each of the retrieved one or more semantically related documents (180);

providing a first list of generic Solution Prompts (260), each of which generic Solution Prompt thereof includes a placeholder for insertion of a word or phrase from the set of concept terms (220);

applying a morphological analysis process to combine (270) the first list of generic Solution Prompts (260) with the obtained set of concept terms (220) so as to create a second list of Specific Solution Prompts (280);

obtaining a first score (340) comprising a number of relevant documents returned from the document archive as a result of a second query performed using each of the respective specific Solution Prompts from the second list of Specific Solution Prompts;

obtaining a second score (330) comprising a number of documents common to a first portfolio and a second portfolio, wherein, the second portfolio (310) comprises relevant documents returned from the document archive as a result of the second query; and, wherein a generated numerical score (350) for each respective Specific Solution Prompt of the second list of Specific Solution Prompts is obtained by algorithmically combining the first score and the second score, and;

each of the respective Specific Solution Prompts in the second list of Specific Solution Prompts prioritized from largest to smallest according to the generated numerical score.

2. The method of claim 1, wherein a predefined number of most relevant documents in each of the first and second portfolios is user definable.

3. The method of claim 1, wherein the first list of generic Solution Prompts includes one or more Solution Prompts based on TRIZ.

4. The method of claim 3, wherein the list of generic solution prompts includes one or more of: 40 Inventive Principles based on TRIZ, a list of separation techniques, 76 Standard Solutions, and Altshuller's Laws of Evolution.

5. The method of claim 1, further comprising associating a probability with each respective Specific Solution Prompt in the second list of Specific Solution Prompts, the probability comprising a ratio of the generated numerical score for each respective Specific Solution Prompt in the second list of Specific Solution Prompts and a sum of the generated numerical score for all of the Specific Solution Prompts in the second list of Specific Solution Prompts.

6. The method of claim 5, wherein one or more Specific Solution Prompts having an associated probability satisfying predetermined criteria are selectable from among the second list of Specific Solution Prompts and displayable to a display device.

7. The method of claim 6, wherein the predetermined criteria is one or more user definable thresholds, wherein, when one or more Specific Solution Prompts has an associated probability greater than or equal to a first threshold, the Specific Solution Prompts having the associated probability greater than or equal to the first threshold are selectable and displayable to the display device one or more times, and wherein, when one or more Specific Solution Prompts has an associated probability lower than a second threshold, the Specific Solution Prompts having the associated probability lower than the second threshold are selectable and displayable to the display device.

8. The method of claim 5, wherein the one or more of the Specific Solution Prompts having an associated probability are randomly selectable and displayable to a display device.

9. The method of claim 8, wherein when a Specific Solution Prompt is randomly selected and displayed to the display device, a next random Specific Solution Prompt that has not been previously selected and displayed to the display device, is selected and displayed to the display device.

10. The method of claim 1, wherein one or more of the prioritized Specific Solution Prompts are selectable and displayable to a display device.

11. The method of claim 1, further comprising tracking the second list of Specific Solution Prompts presented to the user and user interactions with previously presented Specific Solution Prompts.

12. The method of claim 11, further comprising learning a success probability of each presented Specific Solution Prompt and an interaction among the Specific Solution Prompts to form a knowledge base.

13. A computer system that analyzes a problem and proposes a result, the computer system comprising:
an input device;
one or more computers each having one or more processors;
one or more non-transitory computer readable storage media;
program instructions stored on the one or more non-transitory computer readable storage media for execution by at least one of the one or more computer processors, which program instructions when read by a computer including one or more processors, cause the one or more processors to perform operations comprising:
receiving a first query as an input from the input device;
generating, by the semantic extractor, a unified representation of the first query document based on at least one or more of at least one feature-based vector that integrates semantic and feature based characterizations for the input (155);
retrieving one or more documents that are most closely semantically related to the first query from a document archive of the one or more non-transitory computer readable storage media, the documents becoming a first portfolio (290) based on a threshold of similarity between the unified representation of the first query and the unified representations of the documents;
obtaining a set of concept terms derived from each of the retrieved one or more semantically related documents,
providing a first list of generic Solution Prompts, each of which generic Solution Prompt thereof includes a placeholder for insertion of a word or phrase from the set of concept terms;
applying a morphological analysis to combine the first list of generic Solution Prompts with the obtained set of concept terms so as to provide a second list of Specific Solution Prompts;
obtaining a first score (340) comprising a number of relevant documents returned from the document archive as a result of a second query performed using each of the respective specific Solutions Prompts from the second list of Specific Solution Prompts;
obtaining a second score (330) comprising a number of documents common to a first portfolio and a second portfolio,
wherein, the second portfolio (310) comprises relevant documents returned from the document archive as a result of the second query; and,
wherein a generated numerical score (350) for each respective Specific Solution Prompt of the second list of Specific Solution Prompts is obtained by algorithmically combining the first score and the second score, and;
each of the respective Specific Solution Prompts in the second list of Specific Solution Prompts prioritized from largest to smallest according to the generated numerical score.

14. The computer system of claim 13, wherein a predefined number of most relevant documents in each of the first and second portfolios is user definable.

15. The computer system of claim 13, wherein the first list of generic Solution Prompts includes one or more Solution Prompts based on TRIZ.

16. The computer system of claim 15, wherein the first list of generic Solution Prompts includes one or more of: 40 Inventive Principles based on TRIZ, a list of separation techniques, 76 Standard Solutions, and Altshuller's Laws of Evolution.

17. The computer system of claim 13, wherein the one or more processors to perform operations further comprising:
associating a probability with each respective Specific Solution Prompt in the second list of Specific Solution Prompts, the probability comprising a ratio of the generated numerical score for each respective Specific Solution Prompt in the second list of Specific Solution Prompts and a sum of the generated numerical score for all of the Specific Solution Prompts in the second list of Specific Solution Prompts.

18. The computer system of claim 17, wherein one or more Specific Solution Prompts having an associated probability satisfying predetermined criteria are selectable from among the second list of Specific Solution Prompts and displayable to a display device.

19. The computer system of claim 18, wherein the predetermined criteria is one or more user definable thresholds,
wherein, when one or more Specific Solution Prompts has an associated probability greater than or equal to a first threshold, the Specific Solution Prompts having the associated probability greater than or equal to the first threshold are selectable and displayable to the display device one or more times, and
wherein, when one or more Specific Solution Prompts has an associated probability lower than a second threshold, the Specific Solution Prompts having the associated probability lower than the second threshold are selectable and displayable to the display device.

20. The computer system of claim 17, wherein the one or more of the Specific Solution Prompts having an associated probability are randomly selectable and displayable to a display device.

21. The computer system of claim 20, wherein when a Specific Solution Prompt is randomly selected and displayed to the display device, a next random Specific Solution Prompt that has not been previously selected and displayed to the display device, is selected and displayed to the display device.

22. The computer system of claim 13, wherein one or more of the prioritized Specific Solution Prompts are selectable and displayable to a display device.

23. A computer program product, comprising:
a non-transitory computer readable storage medium including computer readable program instructions stored thereon, which program instructions when read by a computer including one or more processors, cause the one or more processors to perform operations comprising:
receiving a first query as an input from an input device;
generating, by the semantic extractor, a unified representation of the first query based on at least one or more of the at least one feature-based vector that integrates semantic and feature-based characterizations for the input (155);

retrieving one or more documents that are most closely semantically related to the first query from a document archive of one or more non-transitory computer readable storage media, the documents becoming a first portfolio (290) based on a threshold of similarity between unified representation of the first query and the unified representations of the documents;

obtaining a set of concept terms derived from each of the retrieved one or more semantically related documents;

providing a first list of generic Solution Prompts, each of which generic Solution Prompt thereof includes a placeholder for insertion of a word or phrase from the set of concept terms; applying a morphological analysis to combine the first list of generic Solution Prompts with the obtained set of concept terms so as to provide a second list of Specific Solution Prompts;

obtaining a first score (340) comprising a number of relevant documents returned from the document archive as a result of a second query performed using each of the respective specific Solutions Prompts from the second list of Specific Solution Prompts;

obtaining a second score (330) comprising a number of documents common to a first portfolio and a second portfolio, wherein, the second portfolio (310) comprises relevant documents returned from the document archive as a result of the second query;

wherein a generated numerical score (350) for each respective Specific Solution Prompt of the second list of Specific Solution Prompts is obtained by algorithmically combining the first score and the second score, and;

each of the respective Specific Solution Prompts in the second list of Specific Solution Prompts prioritized from largest to smallest according to the generated numerical score.

24. The computer program product of claim 23, wherein a predefined number of most relevant documents in each of the first and second portfolios is user definable.

25. The computer program product of claim 23, wherein the first list of generic Solution Prompts includes one or more Solution Prompts based on TRIZ.

26. The computer program product of claim 25, wherein the first list of generic Solution Prompts includes one or more of: 40 Inventive Principles based on TRIZ, a list of separation techniques, 76 Standard Solutions, and Altshuller's Laws of Evolution.

27. The computer program product of claim 23, wherein when the program instructions are read by a computer including the one or more processors, the one or more processors to perform further operations comprising:

associating a probability with each respective Specific Solution Prompt in the second list of Specific Solution Prompts, the probability comprising a ratio of the generated numerical score for each respective Specific Solution Prompt in the second list of Specific Solution Prompts and a sum of the generated numerical score for all of the Specific Solution Prompts in the second list of Specific Solution Prompts.

28. The computer program product of claim 27, wherein one or more Specific Solution Prompts having an associated probability satisfying predetermined criteria are selectable from among the second list of Specific Solution Prompts and displayable to a display device.

29. The computer program product of claim 28, wherein the predetermined criteria is one or more user definable thresholds, wherein, when one or more Specific Solution Prompts has an associated probability greater than or equal to a first threshold, the Specific Solution Prompts having the associated probability greater than or equal to the first threshold are selectable and displayable to the display device one or more times, and wherein, when one or more Specific Solution Prompts has an associated probability lower than a second threshold, the Specific Solution Prompts having the associated probability lower than the second threshold are selectable and displayable to the display device.

30. The computer program product of claim 27, wherein the one or more of the Specific Solution Prompts having an associated probability are randomly selectable and displayable to a display device.

31. The computer program product of claim 30, wherein when a Specific Solution Prompt is randomly selected and displayed to the display device, a next random Specific Solution Prompt that has not been previously selected and displayed to the display device, is selected and displayed to the display device.

32. The computer program product of claim 23, wherein one or more of the prioritized Specific Solution Prompts are selectable and displayable to a display device.

* * * * *